(12) United States Patent
Amar (10) Patent No.: US 9,106,063 B2
(45) Date of Patent: Aug. 11, 2015

(54) ELECTRIC HARDWARE MOUNTING-BRACKET

(71) Applicant: Eitan Amar, Rehovot (IL)

(72) Inventor: Eitan Amar, Rehovot (IL)

(73) Assignee: Shlomi Asulyn, Hod Hasharon (IL)

( * ) Notice: Subject to any disclaimer, the term of this patent is extended or adjusted under 35 U.S.C. 154(b) by 44 days.

(21) Appl. No.: 13/931,639

(22) Filed: Jun. 28, 2013

(65) Prior Publication Data

US 2013/0292169 A1 Nov. 7, 2013

Related U.S. Application Data

(63) Continuation-in-part of application No. PCT/IL2011/000964, filed on Dec. 26, 2011.

(60) Provisional application No. 61/428,872, filed on Dec. 31, 2010.

(51) Int. Cl.
*H02G 3/08* (2006.01)
*H02G 3/12* (2006.01)
*H02G 1/00* (2006.01)

(52) U.S. Cl.
CPC . *H02G 3/12* (2013.01); *H02G 1/00* (2013.01); *H02G 3/123* (2013.01); *Y10T 29/49117* (2015.01)

(58) Field of Classification Search
CPC ........... H02G 3/08; H02G 3/081; H02G 3/10; H02G 3/12; H02G 1/00; H02G 3/123; H02G 3/121; H05K 5/00; H05K 5/02; H01H 9/02; Y10T 29/49117

USPC ................ 174/480, 481, 50, 53, 57, 58, 520; 220/3.2–3.9, 4.02; 248/906, 27.1
See application file for complete search history.

(56) References Cited

U.S. PATENT DOCUMENTS

| 5,117,996 | A | * | 6/1992 | McShane | 220/3.7 |
|---|---|---|---|---|---|
| 5,386,959 | A | | 2/1995 | Laughlin et al. | |
| 5,423,499 | A | * | 6/1995 | Webb | 248/906 |
| 6,098,939 | A | * | 8/2000 | He | 174/58 |
| 6,147,306 | A | * | 11/2000 | Wilkins | 174/58 |
| 6,384,334 | B1 | * | 5/2002 | Webb | 174/58 |
| 6,666,419 | B1 | | 12/2003 | Vrame | |
| 7,025,314 | B1 | | 4/2006 | Thomas et al. | |
| 7,271,336 | B2 | * | 9/2007 | Dinh | 174/58 |
| 7,592,542 | B1 | * | 9/2009 | Gerardo | 174/58 |
| 8,748,744 | B2 | * | 6/2014 | O'Connor et al. | 174/53 |
| 2005/0067180 | A1 | | 3/2005 | Dinh | |
| 2006/0180725 | A1 | | 8/2006 | Weech et al. | |

FOREIGN PATENT DOCUMENTS

WO 2012090193 A2 7/2012

* cited by examiner

*Primary Examiner* — Angel R Estrada
(74) *Attorney, Agent, or Firm* — Novak Druce Connolly Bove + Quigg LLP (57) ABSTRACT

The present disclosure includes an electric-box-assembly mountable on a first wall of a double wall structure for use in conjunction with the second wall of the double wall structure, a method of mounting the electric-box-assembly and wiring of the same. The electric-box-assembly includes a mounting-bracket including one or more mounting units, wherein each of said mounting units comprises a mounting panel; and an electric box. The mounting panel is configured to be directly attached onto the inner side of the first wall of the double wall structure, adjacently thereto, the first wall being erected. The electric box is configured to be mounted onto the inner side of the first wall of the double wall structure before the second wall of the double wall structure is securely attached to the beam-infrastructure.

20 Claims, 13 Drawing Sheets

ELECTRIC HARDWARE MOUNTING-BRACKET

CROSS REFERENCE TO RELATED APPLICATIONS

This application is a continuation-in-part of International Patent Application No. PCT/IL2011/000964 filed on Dec. 26, 2011, which claims the benefit of U.S. Provisional Patent Application No. 61/428,872, filed on Dec. 31, 2010, the disclosures of which is incorporated by reference for all purposes as if fully set forth herein.

FIELD

The present disclosure relates to mounting-brackets for electric/electronic ("electric") equipment, and more particularly, the present disclosure relates to mounting-brackets for electric boxes that are mountable onto a first wall of a double wall structure, before the second wall is erected, wherein the electric box is designated to serve an electric device via the second wall.

BACKGROUND

Framing, in construction known as light-frame construction, such as balloon framing, is a building technique based around structural members, usually called studs, which provide a stable frame to which interior and exterior wall coverings are attached. A wall stud is a vertical member in the light frame construction techniques called balloon framing and platform framing of a building's wall.

Typically, a gap is formed between the wall plate securely attached on each side of the studs. Plumbing, electric, electronic and other devices and networks are constructed inside the gap formed between the two wall plates.

It is desirable to construct the electric infrastructure, including electric boxes, before both wall plates are put in place. Prior are electric brackets for holding the electric boxes, are typically securely attached to the studs. Examples of such electric brackets are provided in U.S. Pat. No. 5,386,959, given to Laughlin et al., in US Patent application Ser. No. 20050067180 by Dinh, in U.S. Pat. No. 6,666,419, given to Vrame, in U.S. Pat. No. 7,025,314, given to Thomas et al., in US Patent application 20060180725 by Weech et al., and others.

There is a need to reduce the interdependency between the frame constructor and the electrician, to accelerate the process and provide better support to the electric box.

Hence, it would be advantageous to have an electric bracket that can be mounted onto a first wall of a double wall structure, before the second wall is erected, wherein the electric box is designated to serve an electric device via the second wall. Having such an electric bracket facilitates to completion of the electric infrastructure in a single iteration, after the stud structure and a first wall have been constructed.

SUMMARY

The principle intentions of the present disclosure include providing an electric bracket that can be mounted onto a first wall of a double wall structure, before the second wall is erected, wherein the electric box is designated to serve an electric device via the second wall. Having such an electric bracket facilitates to completion of the electric infrastructure in a single iteration, after the stud structure and a first wall have been constructed.

According to the teachings of the present disclosure, there is provided an electric-box-assembly mountable on a first wall of a double wall structure, wherein the electric box is designated for use on the second wall of the double wall structure. The electric-box-assembly includes a mounting-bracket including one or more mounting units and an electric box. The mounting-bracket is configured to be securely mounted on the inner side of the first wall of the double wall structure, the first wall being erected. The electric box is configured to be mounted on the mounting-bracket before erecting the second wall of the double wall structure. The assembled electric-box-assembly has a preconfigured height to fit in between the walls of the double wall structure.

The mounting-bracket includes a mounting panel, a wall-attaching-mechanism, an electric-box-holder and an electric-box-interlocking-mechanism. The mounting panel includes a flat external surface operatively disposed on the inner side of the first wall of the double wall structure. The wall-attaching-mechanism is facilitated to securely attach the mounting panel to the inner side of the first wall of the double wall structure. The electric box is securely mounted onto the electric-box-holder using the electric-box-interlocking-mechanism.

Optionally, the wall-attaching-mechanism is selected from the group including screws, bolts, double-sided glue stripes and U shaped pins.

Optionally, the electric-box-interlocking-mechanism is selected from the group including screws, bolts, boss type attachment structures and saw tooth projections.

Preferably, the electric-box-interlocking-mechanism facilitates adjustment of the height of the assembled electric-box-assembly.

Optionally, the electric box is a conventional electric box, wherein the electric-box-interlocking-mechanism of the mounting-bracket is configured to interlock with respective locking elements of the conventional electric box.

Optionally, the electric box is a box having enclosed walls, an enclosed end and an open end, wherein when the electric box is mounted on the mounting-bracket, the open end faces away from the inner side of the first wall of the double wall structure. The electric box may be a rectangular box, a cylindrical box or any other shaped box.

Preferably, a lip is disposed on the edge of the open end of the electric box wherein, when the second wall of the double wall structure is erected, the inner surface of the second wall of the double wall structure is disposed proximal to the lip, preferably, substantially adjacent to the lip.

Preferably, the electric box further includes one or more pairs of conical-grooves formed on the external side of the walls of the electric box, at opposing locations, wherein each of the conical-grooves has the narrower end proximal to the open end of the electric box.

Optionally, the mounting-bracket further includes one or more pairs of conical-posts, disposed at preconfigured locations corresponding to the location of the conical-grooves, wherein when the electric box is mounted on the mounting-bracket each of the conical-posts is fittingly inserted into the respective conical-groove.

Optionally, the conical-posts contain threads matching the threads of an elongated screw inserted through the respective conical-groove, and wherein screwing the screw onto the threads of a conical-post facilitates setting and maintaining the preconfigured height of the assembled electric-box-assembly.

Optionally, the electric box further includes one or more pairs of elongated screws each inserted through the narrow end the respective conical-grooves, wherein a pivotable-wing is mounted proximal to the end of elongated screw. The pivotable-wing is facilitated to operatively pivot outwardly, with respect to the respective side wall of the electric box, by turning the elongated screw. When the pivotable-wing is generally perpendicular to the respective side wall of the electric box, the pivoting motion is terminated by a stopper. Further turning of the elongated screw, moves the pivotable-wing towards the head of the elongated screw, over the threads of the elongated screw, until the pivotable-wing is in communication with the inner side of the second wall of the double wall structure.

Optionally, the mounting-bracket and the electric box are integrated into a single unit, having a preconfigured height.

An aspect of the present disclosure is to provide a method for mounting an electric box on a first wall of a double wall structure, wherein the electric box is designated for use on the second wall of the double wall structure, and wherein only the first wall of a double wall structure is erected. The method includes the steps of providing an electric-box-assembly of the preset disclosure, determining the corresponding mounting location of the electric box on the first wall, affixing the mounting-bracket onto the internal surface of the first wall at the determined mounting location, and assembling the electric box onto the mounting-bracket. After erecting the second wall, an opening is formed at the determined mounting location in the second wall. Preferably, the opening is fitted to the internal space of the mounted electric box.

BRIEF DESCRIPTION OF THE DRAWINGS

The present disclosure will become fully understood from the detailed description given herein below and the accompanying drawings, which are given by way of illustration and example only and thus not limitative of the present disclosure, and wherein:

FIG. 2b is a rear perspective view of the mounting-bracket, as shown in FIG. 2a;

FIG. 10b, a cross section (AA'), side perspective view of the electric-box-assembly shown in FIG. 10a;

DETAILED DESCRIPTION

The present disclosure will now be described more fully hereinafter with reference to the accompanying drawings, in which preferred embodiments are shown. This disclosure may, however, be embodied in many different forms and should not be construed as limited to the embodiments set forth herein; rather, these embodiments are provided, so that this disclosure will be thorough and complete, and will fully convey the scope of the disclosure to those skilled in the art.

An embodiment is an example or implementation. The various appearances of "one embodiment," "an embodiment" or "some embodiments" do not necessarily all refer to the same embodiments. Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments. It is understood that the phraseology and terminology employed herein is not to be construed as limiting and are for descriptive purpose only.

Methods of the present disclosure may be implemented by performing or completing manually, automatically, or a combination thereof, selected steps or tasks. The order of performing some methods step may vary. The descriptions, examples, methods and materials presented in the claims and the specification are not to be construed as limiting but rather as illustrative only.

Meanings of technical and scientific terms used herein are to be commonly understood as to which the disclosure belongs, unless otherwise defined. The present disclosure can be implemented in the testing or practice with methods and materials equivalent or similar to those described herein.

It should be noted that orientation related descriptions such as "bottom", "up", "upper", "down", "lower", "top" and the like, assumes that the associated item is in operationally situated.

Figure 1:
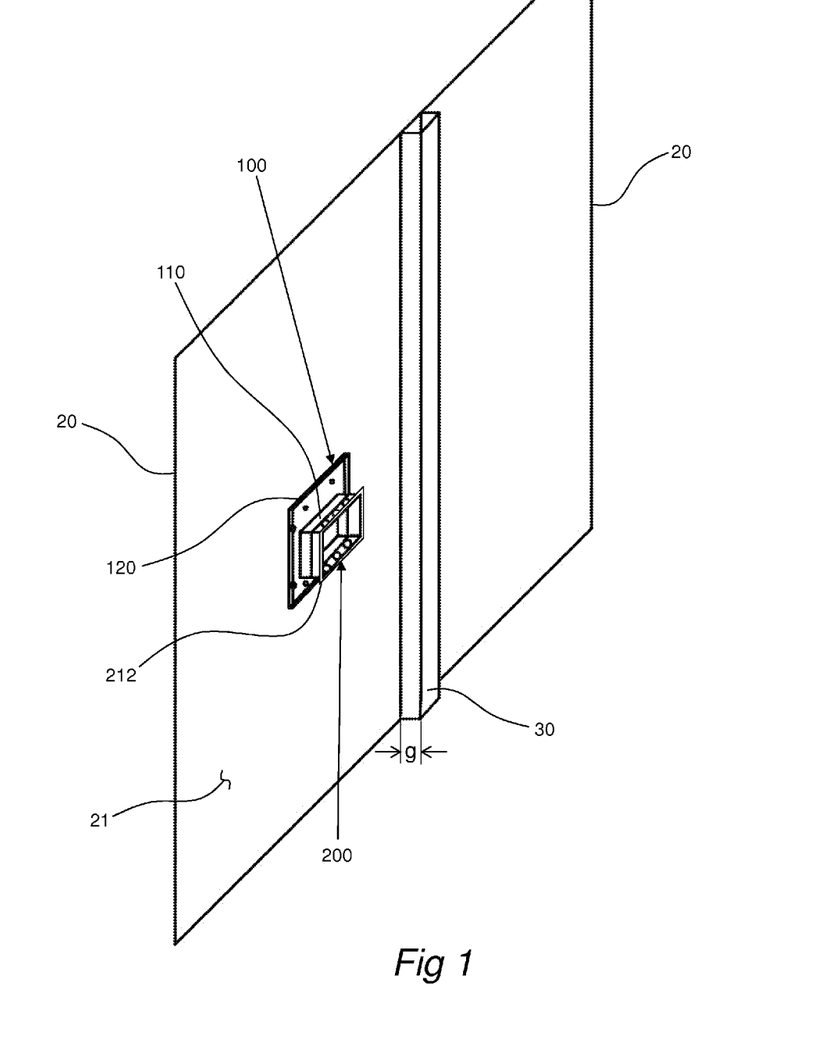
FIG. 1 is a perspective view of an electric-box-assembly, according to embodiments of the present disclosure, mounted on a first wall of a double wall structure.
Figure 2A:
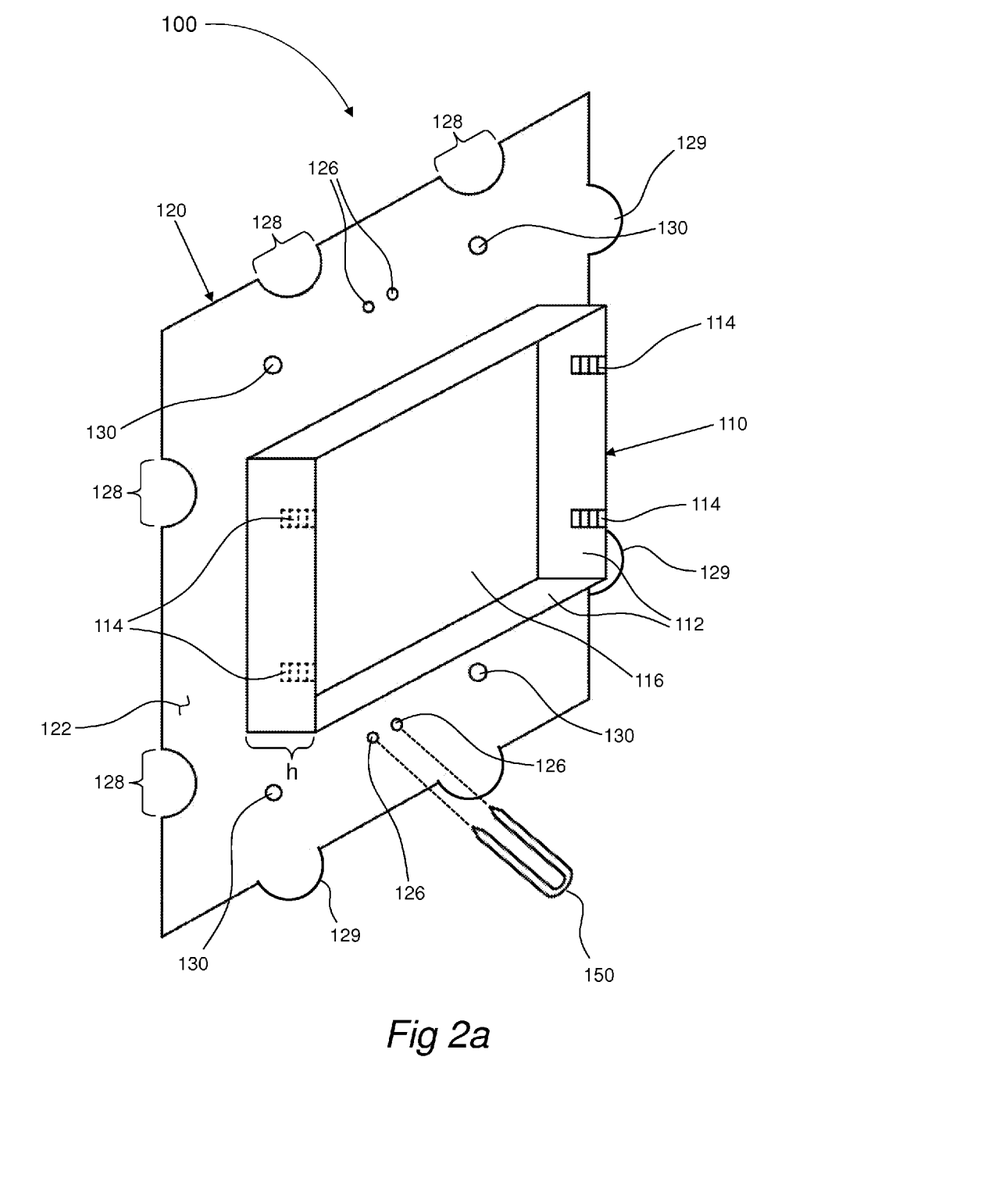
FIG. 2a is a front perspective view of a mounting-bracket, according to embodiments of the present disclosure.
Figure 2B:
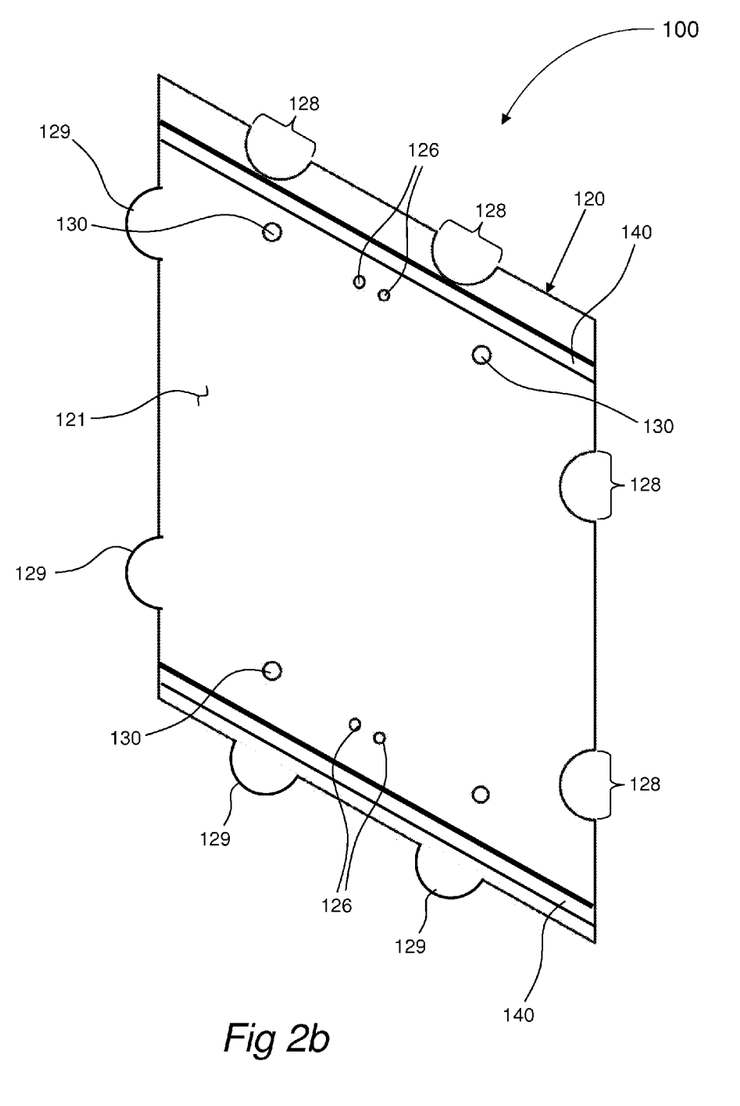
Figure 3:
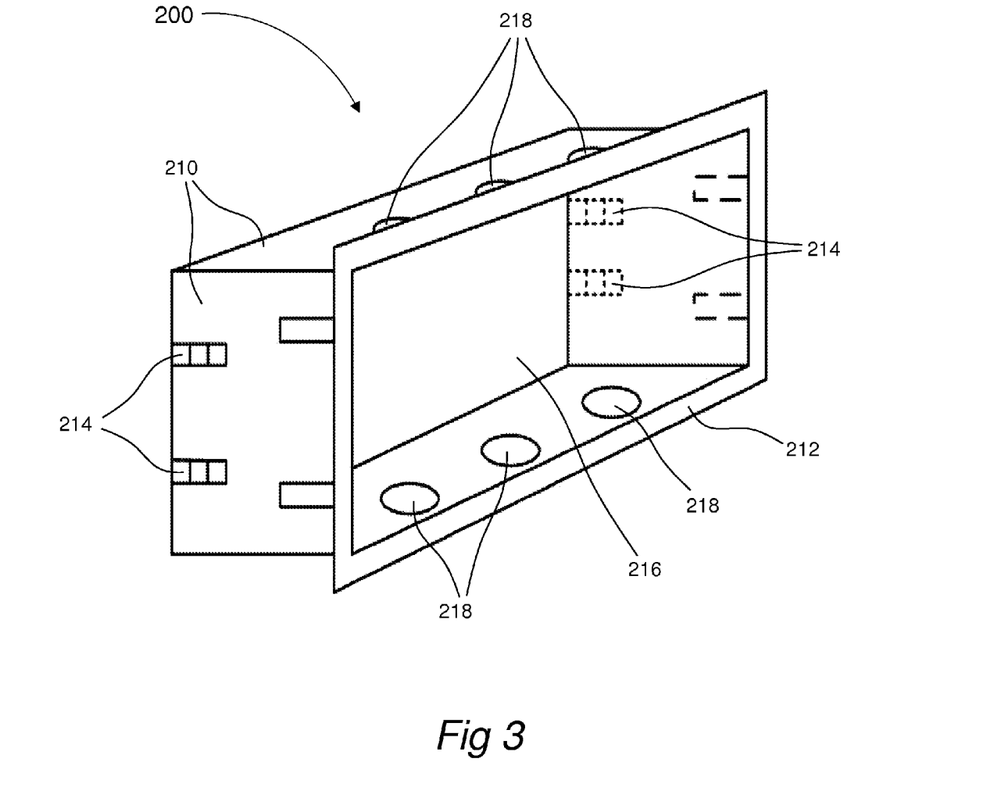
FIG. 3 is a perspective view of an electric box coupled to be assembled onto the mounting-bracket shown in FIGS. 2a and 2b.

Reference is now made to the drawings. FIG. 1 is a perspective view of an electric-box-assembly mounted on the inner face 21 of a first wall 20 of a double wall structure. FIG. 2a is a front perspective view of a mounting-bracket 100, according to embodiments of the present disclosure. FIG. 2b is a rear perspective view of mounting-bracket 100. FIG. 3 is a perspective view of an electric box 200 coupled to be assembled onto mounting-bracket 100. It should be noted the mounting-bracket 100 may be made of a single unit or may include two or separate units that combine to function as a single unit mounting-bracket.

Mounting-bracket 100 includes a mounting panel 120 and an electric-box-holder 110. Mounting panel 120 is a flat panel having two faces: a first face 121 that is disposed adjacently to the inner face 21 of first wall 20, when mounted, and a second face 122, onto which face electric-box-holder 110 is securely attached.

Electric-box-holder 110 is typically, with no limitations, a rectangular box having a larger panel 116, which panel 116 is securely attached to second face 122 of mounting panel 120 or is integrated with mounting panel 120. The side of electric-box-holder 110, opposing panel 116, is open. The other 4 sides of electric-box-holder 110 are extending generally perpendicular to second face 122 of mounting panel 120. On two opposing inner walls 112 of electric-box-holder 110, and optionally on all four inner walls (not shown), quick locking elements 114 are disposed. For example, locking elements 114 can be boss type attachment structures or saw tooth projections, as shown in FIG. 2a, or any other type of locking element.

Electric box 200 has also a fitted rectangular box shape having a larger panel 216 and a body 210 having four walls. The external dimensions of body 210 are fitted to the internal dimensions of walls 112 of electric-box-holder 110.

On two opposing external walls 210 of electric box 200, and optionally on all four external walls, quick locking elements 214 are disposed at location matching the locations of quick locking elements 114 of inner walls 112 of electric-box-holder 110. Hence, when electric box 200 is inserted into electric-box-holder 110, corresponding quick locking elements 114 and quick locking elements 214 operatively engage to interlock. The saw teeth direction is such that electric box 200 slides into electric-box-holder 110, using a slight pushing force. Once in position, electric box 200 cannot slide back out of electric-box-holder 110.

Optionally, electric box 200 includes one or more openable elements 218 facilitation the insertion of pipes into electric box 200.

Optionally, mounting panel 120 includes one or more double-sided glue stripes 140, facilitating the attachment, temporary or permanently, of mounting panel 120 onto the inner face 21 of first wall 20, such that first face 121 is glued to mounting panel 120 onto the inner face 21 of first wall 20.

Optionally, mounting panel 120 includes one or more attachment elements 128 and respective elements 129, facilitating the concatenation of two mounting-brackets 100.

Optionally, mounting-brackets 100 includes a U shaped elongated pin 150 (shown in FIG. 2a in an exploded view), to facilitate an electrician temporarily hold mounting-brackets 100 from the external face of first wall 20, without having to use another person to hold mounting-brackets 100 for him, while he/she securely attaches mounting-brackets 100 to first wall 20, for example by screws. To facilitate the passage of pin 150 through mounting panel 120, mounting panel 120 includes one or more pairs of holes 126 formed in mounting panel 120.

It should be noted, that typically, when securely attaching mounting panel 120 onto the inner face 21 of first wall 20 by screws, for example, holes 130 are formed. The position of pin 150 on the external face of first wall 20, can indicate to the electrician were on the external face of first wall 20 to drive the attaching screws. Alternatively, holes 130 are formed ahead of time at preconfigured locations.

Figure 4:
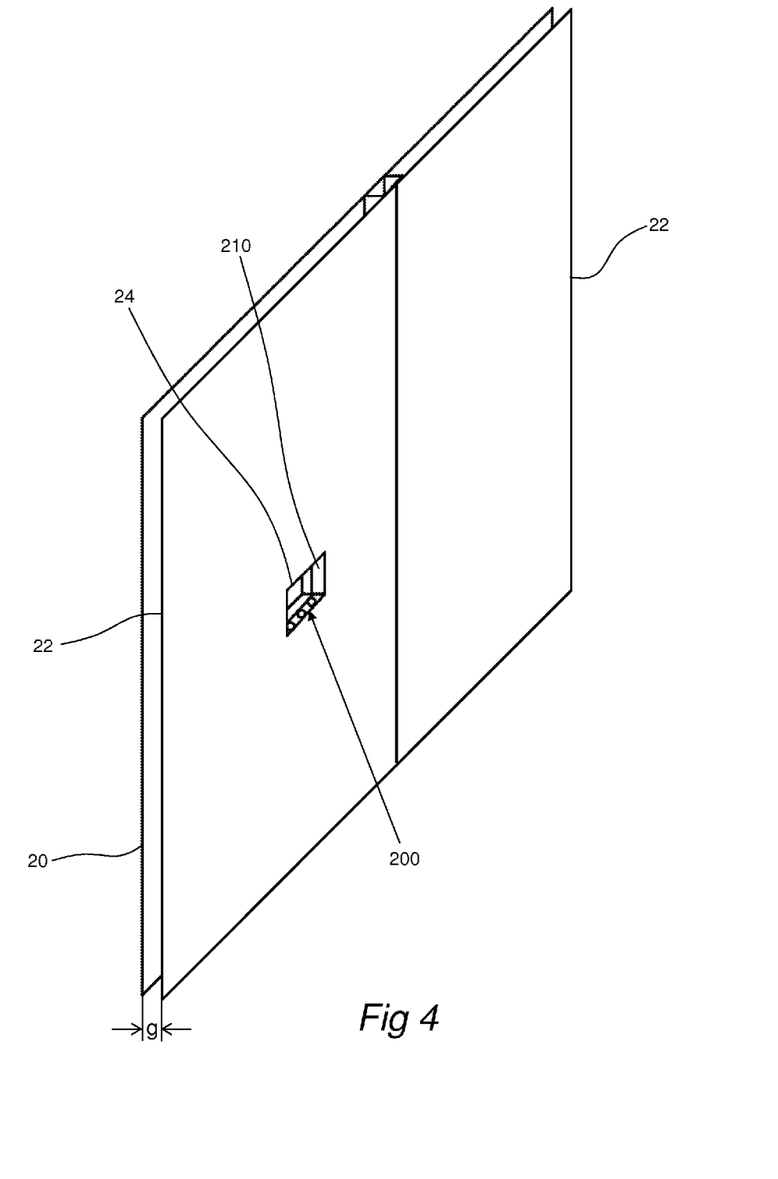
FIG. 4 is a perspective view of the electric box shown in FIG. 3, being part of the electric-box-assembly shown in FIG. 1, after the second wall has been erected, and a window exposing the electric box has been opened.

When erecting the second wall, parallelly coupled with first wall 20, the frame constructor can pre measure the location of the electric boxes, and open respective windows in the second wall. Reference is also made to FIG. 4, which is a perspective view of electric box 200, being part of the electric-box-assembly shown in FIG. 1, after the second wall 22 has been erected, and a window 24, exposing electric box 200, has been opened.

It should be noted that electric box 200 further includes lips 212 that typically prevent a prior art electric box from falling in between walls 20 and 22. An aspect of the present disclosure is to facilitate the constructor to cut window 24 in wall 22, such that the respective edges of window 24 flush with the inner side of walls 210. Hence, in the present disclosure, lips 212 are disposed adjacently to the inner face of second wall 22 and thereby, improving the structural stability and fixedness of the electric-box-assembly of the present disclosure.

It should be noted that height h (see FIG. 2a) of mounting-bracket 100, together with the height of the mounted electric box 200, is designed to fit the gap g (see FIGS. 1 and 4) formed between the inner faces of walls 20 and 22.

It should be further noted that the electric-box-assembly may include mounting-brackets 100, according to the present disclosure, and use a prior art electric box, wherein the inner space of mounting-brackets 100 fits the external dimensions of the four periphery walls of the prior art electric box. In such embodiments, the electric box is securely attached to mounting-brackets 100 by conventional attaching means such as screws, glue, silicon, double-sided glue stripes, and the like.

It should be further noted that mounting-brackets 100 of the present disclosure, makes no use of a stud 30, as do prior art mounting-brackets.

Figure 5:
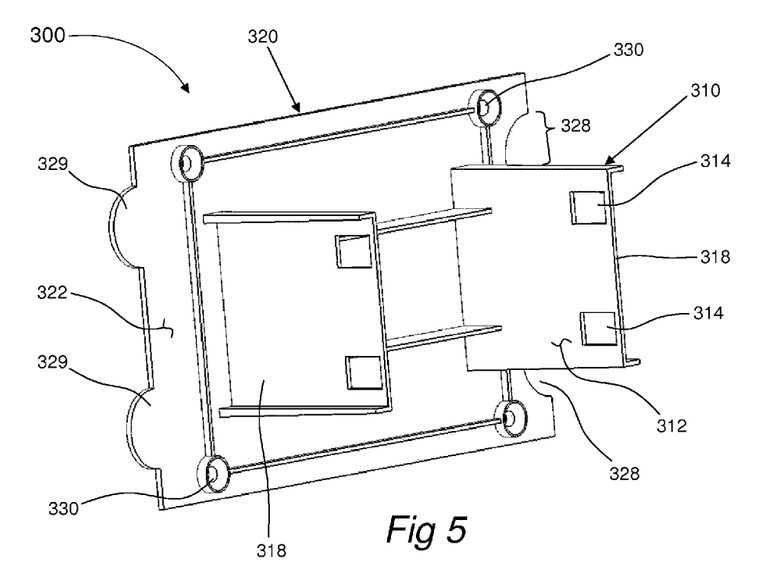
FIG. 5 is a perspective view of another mounting-bracket, according to embodiments of the present disclosure.
Figure 6:
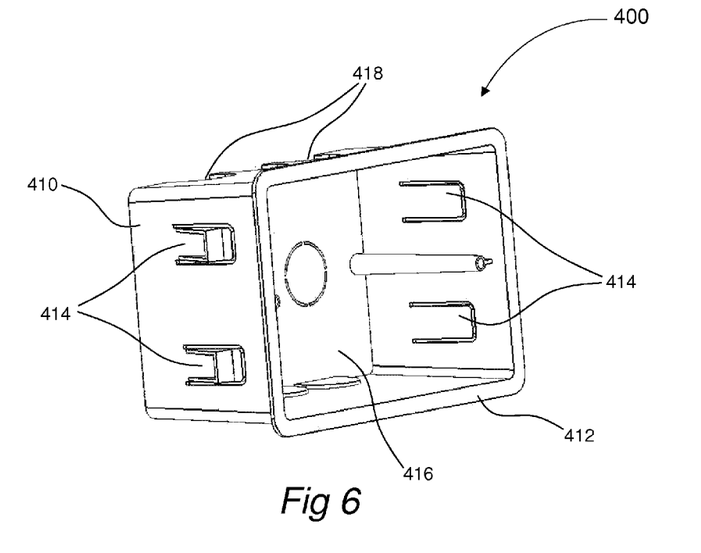
FIG. 6 is a perspective view of an electric box coupled to be assembled onto the mounting-bracket shown in FIG. 5.
Figure 7:
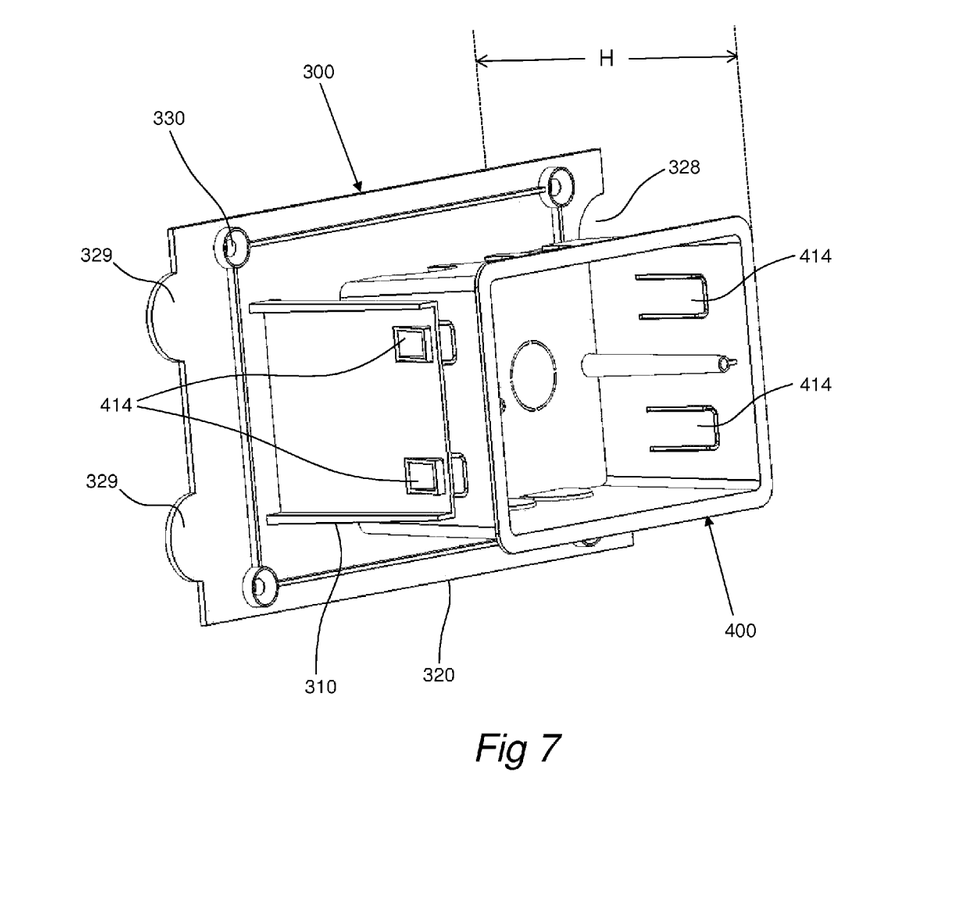
FIG. 7 is a perspective view illustration of the electric-box-assembly including the electric box shown in FIG. 6 assembled onto the mounting-bracket shown in FIG. 5.

Reference is now made to FIG. 5, a perspective view of another mounting-bracket 300, according to an embodiment of the present disclosure; to FIG. 6, a perspective view of an electric box 400 coupled to be assembled onto the mounting-bracket 300; and to FIG. 7, a perspective view illustration of electric box 400 assembled onto mounting-bracket 300.

Mounting-bracket 300 includes a mounting panel 320 and an electric-box-holder 310. Mounting panel 320 is a flat panel having two faces: a first face that is disposed adjacently to the inner face 21 of first wall 20, when mounted, and a second face 322, onto which face electric-box-holder 310 is securely attached.

Electric-box-holder 310 includes wall structures 318, securely attached to second face 322 of mounting panel 320 or is integrated with mounting panel 320 and extending generally perpendicular to second face 322. Quick locking window elements 314 are formed at preconfigured locations in the two opposing wall structures 318 of electric-box-holder 310.

Electric box 400 has a rectangular box shape having a larger panel 416 and a body 410 having four walls. The external dimensions of the walls of body 410 are fitted to slide in between the internal dimensions of wall structures 318 of electric-box-holder 310. On two opposing external walls of body 410, quick locking elements 414 are disposed at location matching the locations of window elements 314 of inner walls 312 of wall structures 318. Hence, when electric box 400 is inserted in between wall structures 318, corresponding quick locking elements 414 and window elements 314 operatively engage to interlock. The protrusions of quick locking elements 414 slides into respective window elements 314, using a slight pushing force. Once in position, electric box 400 cannot slide back out of electric-box-holder 310.

It should be noted that height H (see FIG. 7) of mounting-bracket 300, together with the mounted electric box 400, is designed to fit the gap g (see FIGS. 1 and 4) formed between the inner faces of walls 20 and 22.

Optionally, electric box 400 includes one or more openable elements 418 facilitation the insertion of pipes into electric box 400.

Optionally, mounting panel 320 includes one or more attachment elements 328 and respective elements 329, facilitating the concatenation of two mounting-brackets 300.

Figure 8:
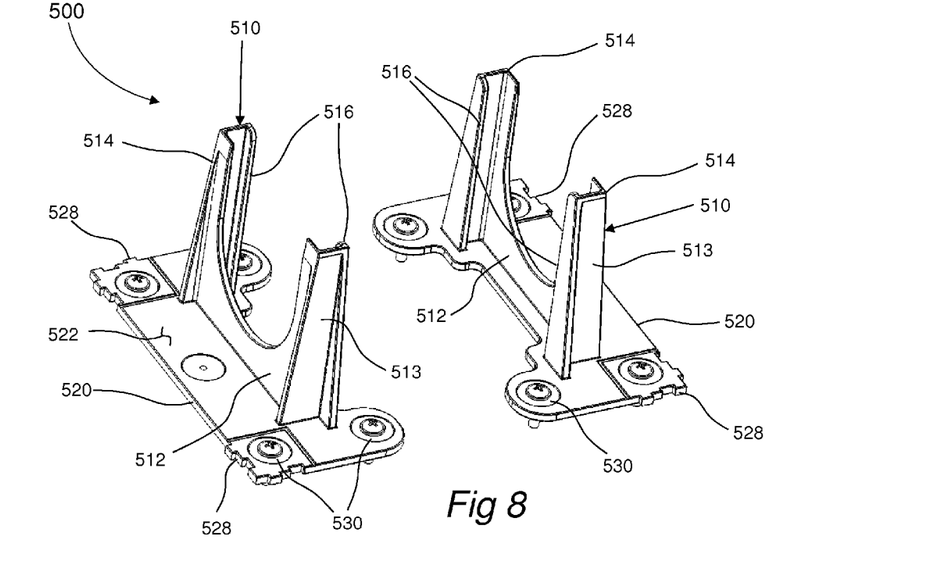
FIG. 8 is a perspective view of another mounting-bracket, according to embodiments of the present disclosure.
Figure 9:
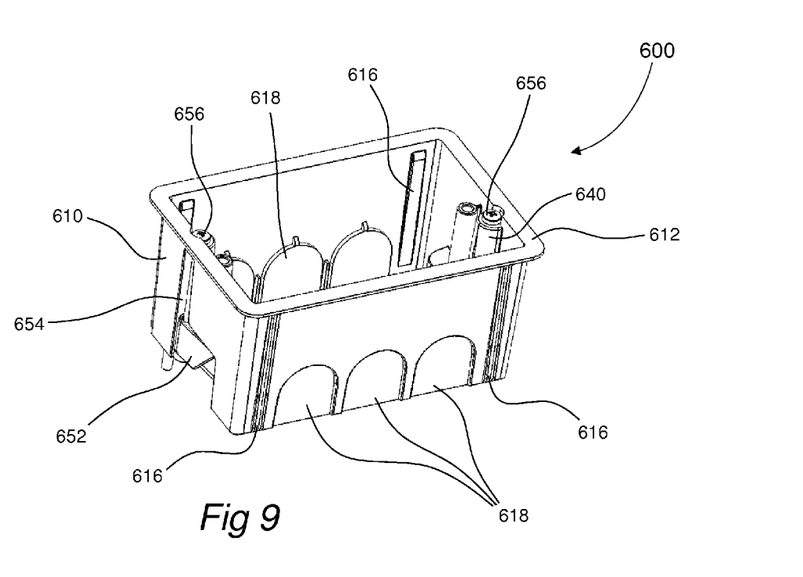
FIG. 9 is a perspective view of an electric box coupled to be assembled onto the mounting-bracket shown in FIG. 8.
Figure 10A:
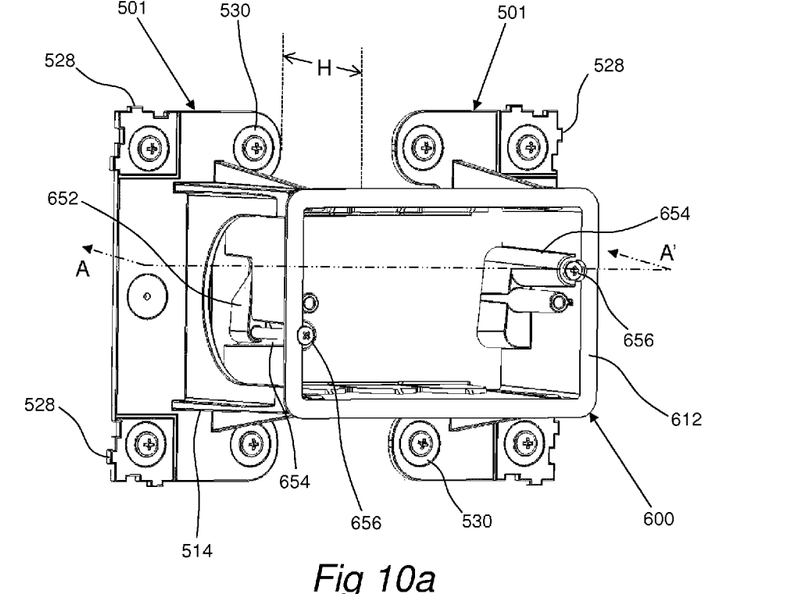
FIG. 10a is a perspective view illustration of the electric-box-assembly including the electric box shown in FIG. 9 assembled onto the mounting-bracket shown in FIG. 8.
Figure 10B:
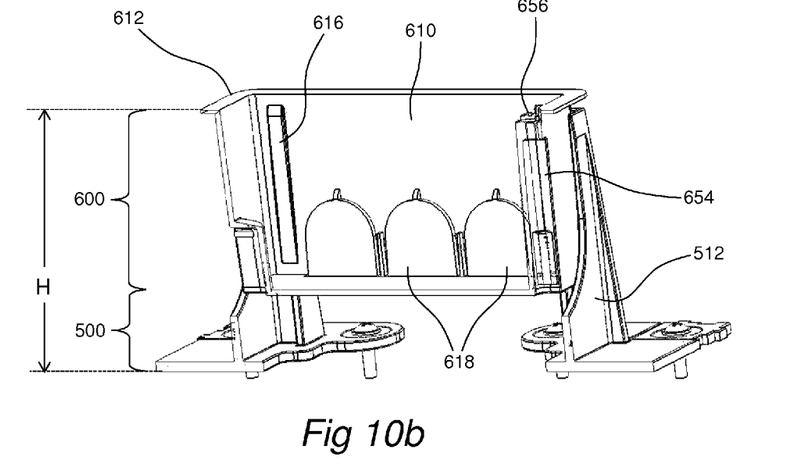

Reference is now made to FIG. 8, a perspective view of another mounting-bracket 500, according to an embodiment of the present disclosure; to FIG. 9, a perspective view of an electric box 600 coupled to be assembled onto the mounting-bracket 500; to FIG. 10a, a perspective view illustration of an electric-box-assembly including electric box 600 assembled onto mounting-bracket 500; and to FIG. 10b, a cross section (AA'), side perspective view of the electric-box-assembly shown in FIG. 10a.

Mounting-bracket 500 includes two mounting units 510 that combine to form an electric-box-holder. Each mounting units 510 includes a mounting panel 520 and two electric box corner holders 514. Mounting panel 520 is a flat panel having two faces: a first face that is disposed adjacently to the inner face 21 of first wall 20, when mounted, and a second face 522, onto which face electric box corner holders 514 are securely attached. Electric box corner holders 514 are securely attached to second face 522 of mounting panel 520 or are integrated with mounting panel 520 and extending generally perpendicular to second face 522. Each electric box corner holders 514 includes a locking mechanism, for example, an outer wall 512, a side wall 513 and a rib 516 extending inwardly, parallel to outer wall 512.

Electric box 600 has a rectangular box shape having a larger panel and a body 610 having four walls. The external dimensions of the walls of body 610 are fitted to slide in between the internal dimensions of outer walls 512 of electric-box-holder 510. At a preconfigured location on the external walls of body 610, quick-locking-grooves 616 are formed at locations proximal to the corner edges, matching the locations of ribs 516. Hence, when electric box 600 is inserted in between outer wall 512, corresponding ribs 516 are slidingly inserted into quick-locking-grooves 616 to operatively interlock.

It should be noted that height H (see FIGS. 10a and 10b) of mounting-bracket 500, together with the mounted electric box 600, is designed to fit the gap g (see FIGS. 1 and 4) formed between the inner faces of walls 20 and 22.

Optionally, electric box 600 includes one or more openable elements 618 facilitation the insertion of pipes into electric box 600.

Optionally, mounting panel 520 includes one or more attachment elements 528, facilitating the concatenation of two mounting-brackets 500.

Preferably, electric box 600 further includes a tightening mechanism for tightening electric box 600 being mounted onto mounting-bracket 500, to structure wall 22. For example, the tightening mechanism includes an elongated screw 656, accessible from the open side of electric box 600, a conical-groove 654, formed on the external side of a pair of side walls 610 wherein the narrower end of conical-groove 654 is proximal to the open side of electric box 600, and a pivotable-wing 652. In idle state, pivotable-wing 652 is disposed flush with the external surface of the respective side walls 610 or internally therefrom.

Elongated screw 656 is disposed inside conical-groove 654, wherein pivotable-wing 652 is mounted proximal to the end of elongated screw 656. Pivotable-wing 652 can be operatively pivoted outwardly, with respect to the respective side wall 610 by turning elongated screw 656. When pivotable-wing 652 is generally perpendicular to the respective side wall 610, the pivoting motion is terminated by a stopper (not shown). Further turning of elongated screw 656, moves pivotable-wing 652 towards the head of elongated screw 656, advancing over the threads of elongated screw 656.

Figure 11:
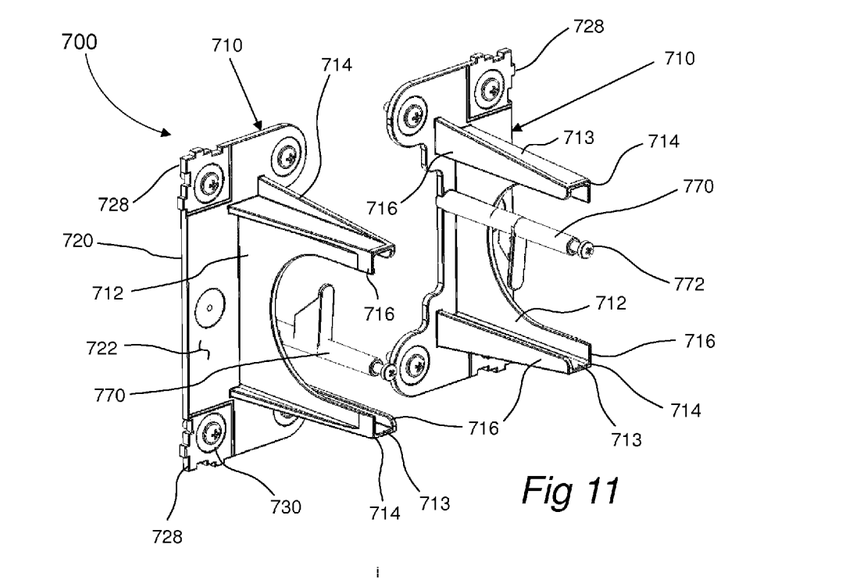
FIG. 11 is a perspective view of another mounting-bracket, according to preferred embodiments of the present disclosure.
Figure 12:
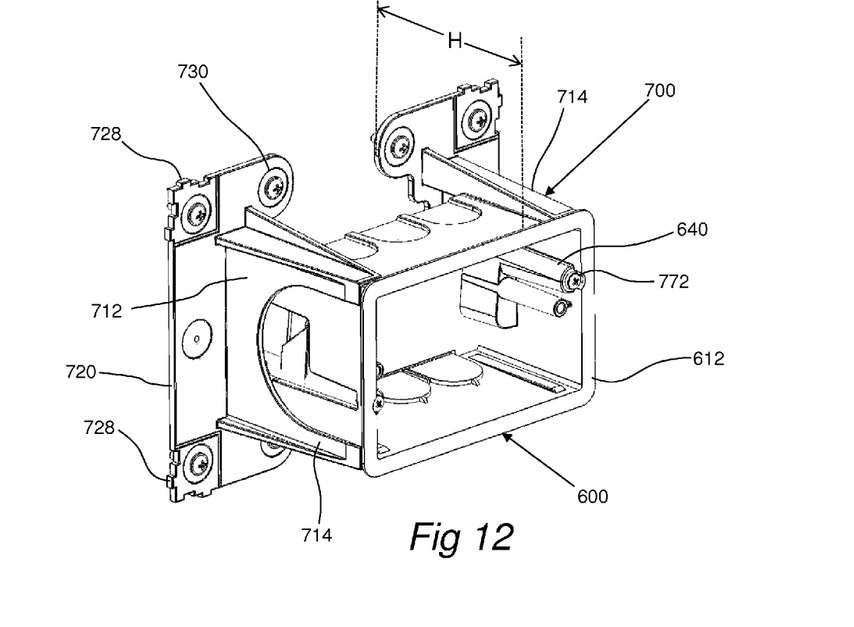
FIG. 12 is a perspective view of the electric-box-assembly including the electric box shown in FIG. 9 assembled onto the mounting-bracket shown in FIG. 11.

Reference is now made to FIG. 11, a perspective view of another mounting-bracket 700, according to a preferred embodiment of the present disclosure; and to FIG. 12, a perspective view illustration of an electric-box-assembly including electric box 600 assembled onto mounting-bracket 700. The electric box used in this embodiment is electric box 600 and mounting-bracket 700 is similar to mounting-bracket 500 except that mounting-bracket 700 further includes a mechanism for securely attaching electric box 600 to mounting-bracket 700.

Mounting-bracket 700 includes two mounting units 710 that combine to form an electric-box-holder. Each mounting units 710 includes a mounting panel 720 and two electric box corner holders 714. Mounting panel 720 is a flat panel having two faces: a first face that is disposed adjacently to the inner face 21 of first wall 20, when mounted, and a second face 722, onto which face electric box corner holders 714 are securely attached. Electric box corner holders 714 are securely attached to second face 722 of mounting panel 720 or are integrated with mounting panel 720 and extending generally perpendicular to second face 722. Each electric box corner holders 714 includes a locking mechanism, for example, an outer wall 712, a side wall 713 and a rib 716 extending inwardly, parallel to outer wall 712.

Mounting-bracket 700 further includes an attaching mechanism, including one or preferably two conical-posts 770, disposed on mounting panel 720 at a location corresponding to the location of conical-groove 654, formed on the external side of a pair of side walls 610. When electric box 600 is mounted onto mounting-bracket 700, each conical-groove 654 slides over the respective conical-post 770, to thereby further stabilize the electric box, in particular before erecting second wall 22 of the double wall structure.

It should be noted that height H (see FIG. 12) of mounting-bracket 700, together with the mounted electric box 600, is designed to fit the gap g (see FIGS. 1 and 4) formed between the inner faces of walls 20 and 22. A screw 772, similarly to screw 656, is inserted through electric box 600 and threaded onto respective threads inside respective conical-post 770 of mounting-bracket 700. Thereby, screw 772 serves as a stopper to electric box 600 such that height H is set and kept at a preconfigured height, typically before erecting second wall 22 of the double wall structure.

Optionally, mounting panel 720 includes one or more attachment elements 728, facilitating the concatenation of two mounting-brackets 700.

Figure 13:
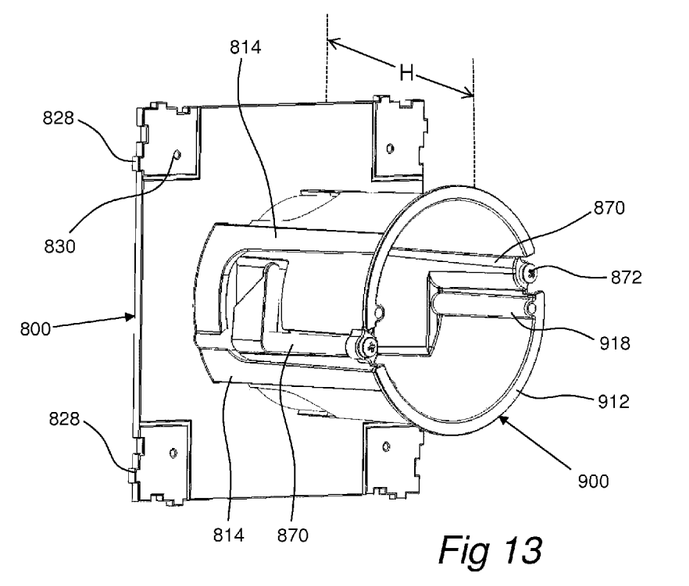
FIG. 13 is a perspective view of an electric-box-assembly including a round electric box assembled onto a mounting-bracket, according to embodiments of the present disclosure.
Figure 14:
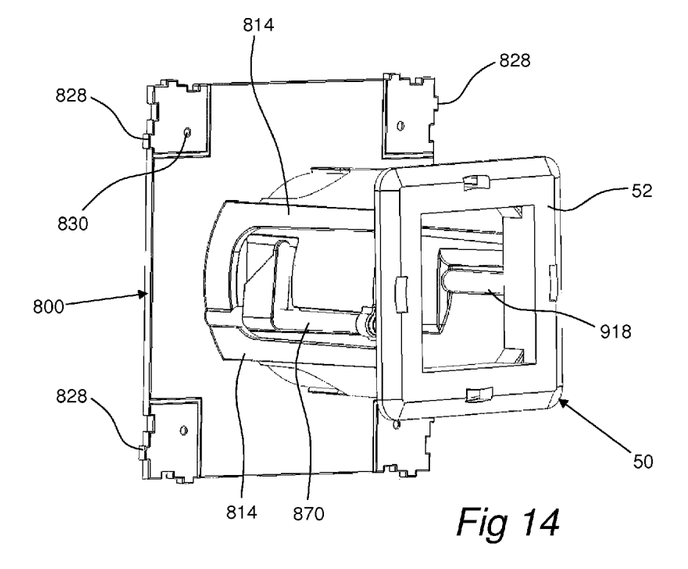
FIG. 14 is a perspective view the electric-box-assembly shown in FIG. 13, with a switch-interface-member mounted thereon.

Reference is now made to FIG. 13, a perspective view of an electric-box-assembly including a round electric box 900 assembled onto mounting-bracket 800, according to an embodiment of the present disclosure; and to FIG. 14, a perspective view illustration of a the electric-box-assembly shown in FIG. 13, having a switch-interface-member 50 mounted thereon. The electric box used in this embodiment is similar to mounting-bracket 800 except that mounting-bracket 800 is configured to accommodate round electric box 900. Switch-interface-member 50 is mounted onto round electric box 900 utilizing interface post 918.

It should be noted that height H (see FIG. 13) of mounting-bracket 700 (see FIGS. 11 and 12), together with the mounted electric box 800, is designed to fit the gap g (see FIGS. 1 and 4) formed between the inner faces of walls 20 and 22.

Optionally, mounting panel 720 includes one or more attachment elements 728 (see FIGS. 11 and 12), facilitating the concatenation of two mounting-brackets 700.

Figure 15:
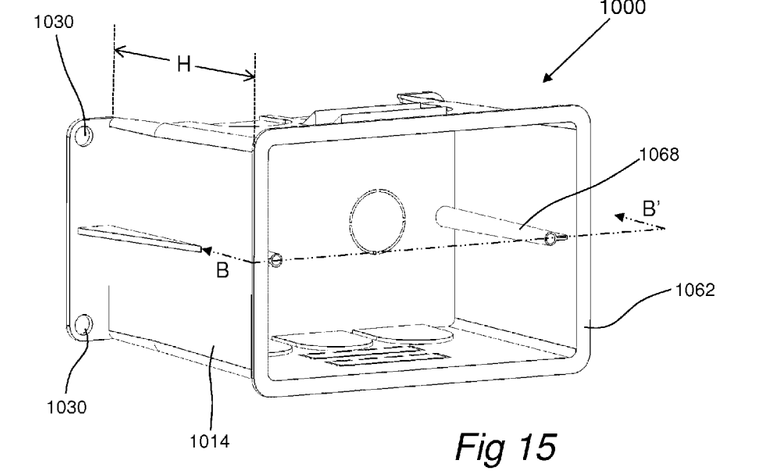
FIG. 15 is a top perspective view of another mounting-bracket, according to embodiments of the present disclosure, having an electric box integrated thereon, thereby having a fixed height.
Figure 16:
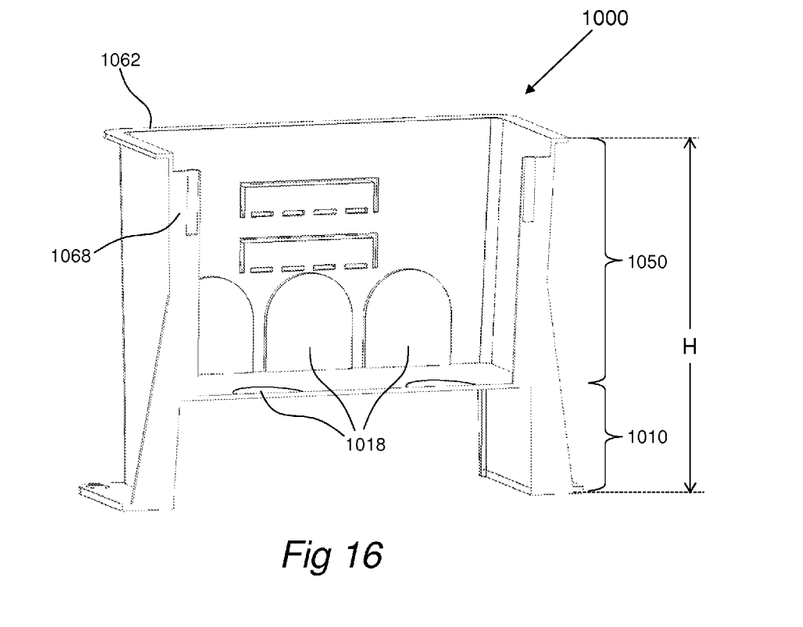
FIG. 16 is a cross section (BB'), side perspective view the mounting-bracket shown in FIG. 15.

Reference is now made to FIG. 15, a top perspective view of an electric box device 1000, according to an embodiment of the present disclosure, having an electric box 1050 integrated onto a mounting-bracket 1010, thereby having a fixed height; and to FIG. 16, a cross section (BB'), side perspective view of electric box device 1000.

The height H of electric box device 1000 is preconfigured to fit the gap g (see FIGS. 1 and 4) formed between the inner faces of walls 20 and 22.

Figure 17:
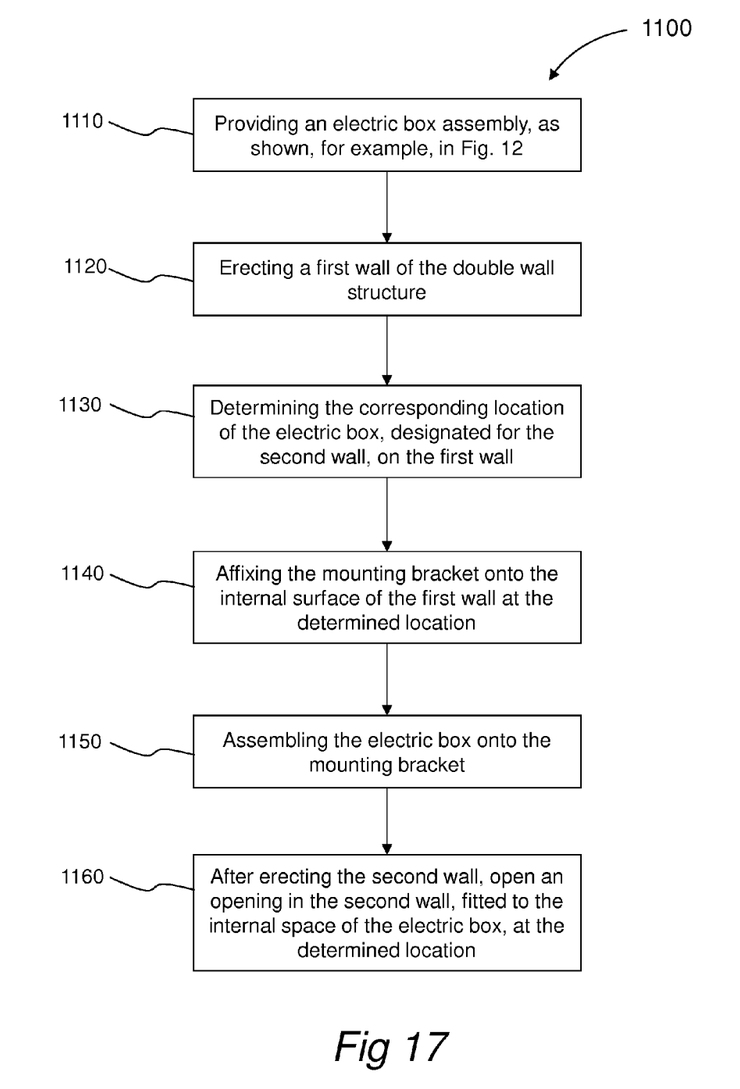
FIG. 17 is a schematic flow chart showing an example method for mounting an electric-box-assembly, according to embodiments of the present disclosure.

Reference is now made to FIG. 17, a schematic flow chart showing an example method 1100 for mounting an electric-box-assembly, for example, electric box 600 and mounting-bracket 700, according to embodiments of the present disclosure. The electric-box-assembly is mounted on a first wall 20 of a double wall structure, wherein the electric-box-assembly is designated for use on the second wall of the double wall structure. An electric-box-assembly as shown, for example, in FIGS. 11 and 12, is provided in step 1110. Method 1100 proceeds as follows:

Step 1120: erecting the first wall of the double wall structure.

Erecting a first wall 20 of the double wall structure. This step may precede step 1100.

Step 1130: determining the corresponding mounting location of the electric box, designated for the second wall, on the first wall.

Determining the corresponding mounting location of electric box 600, on first wall 20, wherein electric box 600 is designated to be operatively associated with second wall 22.

Step 1140: affixing the mounting-bracket onto the internal surface of the first wall at the determined location.

Affixing mounting-bracket 700 onto the internal surface 21 of first wall 20, at the location determined in step 1130.

Step 1150: assembling the electric box onto the mounting-bracket. Assembling electric box 600 onto mounting-bracket 700.

Step 1160: after erecting the second wall, open an opening in the second wall.

After erecting second wall 22, form an opening in second wall 22, fitted to the internal space of electric box 600, at the determined location. Typically, the opening is formed flush with the external surface of the respective side walls 610 of electric box 600. Thereby, wall 22 durably fixates to position of the electric-box-assembly between walls 20 and 22.

The disclosure being thus described in terms of several embodiments and examples, it will be obvious that the same may be varied in many ways. Such variations are not to be regarded as a departure from the spirit and scope of the disclosure, and all such modifications as would be obvious to one skilled in the art.

What is claimed is:

1. An electric-box-assembly mountable on a first wall of a double wall structure for use in conjunction with the second wall of the double wall structure, the double wall structure further includes a beam-infrastructure, wherein the first and second walls include an inner side and external side and wherein when assembled, the respective inner side of the first and second walls are securely attached to the beam-infrastructure, said electric-box-assembly comprising:
   a) a mounting-bracket including one or more mounting units, wherein each of said mounting units comprises a mounting panel; and
   b) an electric box,
   wherein said mounting panel is configured to be directly attached onto the inner side of the first wall of the double wall structure, adjacently thereto, the first wall being erected;
   wherein said direct attachment of said mounting panel onto the inner side of the first wall of the double wall structure, ensures direct contact of said one or more mounting panels with the inner side of the first wall of the double wall structure;
   wherein said electric box is configured to be mounted onto the inner side of the first wall of the double wall structure before the second wall of the double wall structure is securely attached to the beam-infrastructure; and
   wherein said assembled electric-box-assembly has a preconfigured height to fit in between the walls of the double wall structure.

2. The electric-box-assembly of claim 1, wherein said mounting-bracket further comprises:
   a) a wall-attaching-mechanism;
   b) an electric-box-holder; and
   c) an electric-box-interlocking-mechanism,
   wherein said mounting panel includes a flat external surface operatively disposed on the inner side of the first wall of the double wall structure;
   wherein said wall-attaching-mechanism is facilitated to securely attach said mounting panel to the inner side of the first wall of the double wall structure; and
   wherein said electric box is securely mounted onto said electric-box-holder using said electric-box-interlocking-mechanism.

3. The electric-box-assembly of claim 2, wherein said wall-attaching-mechanism is selected from the group including screws, bolts, double-sided glue stripes and U shaped pins.

4. The electric-box-assembly of claim 2, wherein said electric-box-interlocking-mechanism is selected from the group including screws, bolts, boss type attachment structures and saw tooth projections.

5. The electric-box-assembly of claim 2, wherein said electric-box-interlocking-mechanism facilitates adjustment of said height of said assembled electric-box-assembly.

6. The electric-box-assembly of claim 2, wherein said electric box is a prior-art electric box and wherein said electric-box-interlocking-mechanism of said mounting-bracket, is configured to interlock with said prior-art electric box.

7. The electric-box-assembly as in claim 1, wherein said electric box is a box having enclosed walls, an enclosed end and an open end, wherein when said electric box is mounted on said mounting-bracket, said open end faces away from the inner side of the first wall of the double wall structure.

8. The electric-box-assembly as in claim 1, wherein said electric box is a rectangular box.

9. The electric-box-assembly as in claim 1, wherein said electric box is a cylindrical box.

10. The electric-box-assembly as in claim 7, wherein a lip is disposed on the edge of said open end, and wherein when the second wall of the double wall structure is erected, the inner surface of the second wall of the double wall structure is disposed adjacent to said lip.

11. The electric-box-assembly as in claim 10, wherein when the second wall of the double wall structure is erected, the inner surface of the second wall of the double wall structure is disposed substantially adjacent to said lip.

12. The electric-box-assembly as in claim 10, wherein when the second wall of the double wall structure is erected, the inner surface of the second wall of the double wall structure is disposed proximal to said lip.

13. The electric-box-assembly as in claim 7, wherein said electric box further includes one or more pairs of conical-grooves formed on the external side of said walls of said electric box, at opposing locations, and wherein each of said conical-grooves has the narrower end proximal to said open end of said electric box.

14. The electric-box-assembly as in claim 13, wherein said mounting-bracket further comprises one or more pairs of conical-posts, disposed at preconfigured locations corresponding to the location of said conical-grooves,
wherein when said electric box is mounted on said mounting-bracket, each of said conical-posts is fittingly inserted into the respective conical-groove.

15. The electric-box-assembly as in claim 14, wherein said conical-posts include threads matching the threads of a screw inserted through each of said conical-groove, and wherein screwing said screw onto said threads of said conical-posts, facilitates setting and maintaining said preconfigured height of said assembled electric-box-assembly.

16. The electric-box-assembly as in claim 12, wherein said electric box further includes one or more pairs of elongated screws each inserted through the narrow end the respective conical-grooves,
wherein a pivotable-wing is mounted proximal to the end of elongated screw;
wherein said pivotable-wing is facilitated to operatively pivot outwardly, with respect to the respective side wall of said electric box, by turning said elongated screw;
wherein when said pivotable-wing is generally perpendicular to the respective side wall of said electric box, the pivoting motion is terminated by a stopper; and
wherein further turning of said elongated screw, moves said pivotable-wing towards the head of said elongated screw, over the threads of said elongated screw, until said pivotable-wing is in communication with the inner side of the second wall of the double wall structure.

17. The electric-box-assembly of claim 1, wherein said mounting-bracket and said electric box are integrated into a single unit, having said preconfigured height.

18. A method for mounting an electric box on a first wall of a double wall structure, wherein the electric box is designated for use at a desired location on the second wall of the double wall structure, the double wall structure further includes a beam-infrastructure, wherein the first and second walls include an inner side and external side and wherein when assembled, the respective inner side of the first and second walls are securely attached to the beam-infrastructure, and wherein only the first wall of a double wall structure is erected, the method comprising the steps of:
a) providing an electric-box-assembly including:
   i. a mounting-bracket, wherein each of said mounting units comprises a mounting panel; and
   ii. an electric box;
b) determining the mounting location of said electric box on the first wall corresponding to said desired location on said second wall;
c) affixing said mounting panel directly onto the internal surface of the first wall at said determined mounting location, wherein said direct affixing of said mounting panel onto the inner side of the first wall of the double wall structure, ensures direct contact of said one or more mounting panels with the inner side of the first wall of the double wall structure; and
d) assembling said electric box onto said mounting-bracket, wherein after erecting the second wall, forming an opening at said determined mounting location in the second wall.

19. The method of claim 18, wherein said opening is fitted to the internal space of said mounted electric box.

20. A method for wiring the electricity in a double wall structure, wherein the electric box is designated for use at a desired location on the second wall of the double wall structure, the double wall structure further includes a beam-infrastructure, wherein the first and second walls include an inner side and external side and wherein when assembled, the respective inner side of the first and second walls are securely attached to the beam-infrastructure, and wherein only the first wall of a double wall structure is erected, the method comprising the steps of:
a) erecting a first wall of the double wall structure;
b) assembling electric boxes for use in conjunction with said first wall, onto said first wall;
c) providing one or more electric-box-assembly for use in conjunction with the second wall, including:
   i. a mounting-bracket, wherein each of said mounting units comprises a mounting panel; and
   ii. an electric box;
d) determining the mounting location of said electric box on said first wall corresponding to said desired location on said second wall;
e) affixing said mounting panel directly onto the internal surface of said first wall at said determined mounting location, wherein said direct affixing of said mounting panel onto the inner side of the first wall of the double wall structure, ensures direct contact of said one or more mounting panels with the inner side of the first wall of the double wall structure;
f) assembling said electric box onto said mounting-bracket;
g) assembling wiring conduits;
h) wiring all assembled electric boxes;
i) erecting said second wall of the double wall structure; and
j) forming an opening in said second wall at said determined mounting location in said second, corresponding with the respective location of each of said electric-box-assemblies.

\* \* \* \* \*